(12) United States Patent
Fujii et al.

(10) Patent No.: US 7,491,674 B2
(45) Date of Patent: Feb. 17, 2009

(54) CATALYST ELEMENT AND MANUFACTURING METHOD THEREOF

(75) Inventors: Misako Fujii, Chigasaki (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 848 days.

(21) Appl. No.: 10/496,093

(22) PCT Filed: Oct. 29, 2002

(86) PCT No.: PCT/JP02/11189

§ 371 (c)(1),
(2), (4) Date: May 20, 2004

(87) PCT Pub. No.: WO03/043733

PCT Pub. Date: May 30, 2003

(65) Prior Publication Data

US 2004/0266617 A1   Dec. 30, 2004

(30) Foreign Application Priority Data

Nov. 22, 2001   (JP)   ............................... 2001-357920

(51) Int. Cl.
*B01J 23/00* (2006.01)
*B01J 21/00* (2006.01)
*B01J 20/00* (2006.01)

(52) U.S. Cl. .................. 502/340; 502/178; 502/263; 502/327; 502/328; 502/330; 502/332; 502/333; 502/334; 502/339; 502/341; 502/349; 502/350; 502/351; 502/355; 502/407; 502/415; 502/439; 502/527.19

(58) Field of Classification Search ................ 502/178, 502/263, 327, 332, 333, 334, 339, 349, 350, 502/351, 355, 407, 415, 439, 527.19, 328, 502/330, 340, 341
See application file for complete search history.

(56) References Cited

U.S. PATENT DOCUMENTS

| 4,033,779 | A |   | 7/1977 | Winkler ........................ 106/62 |
| 4,211,672 | A | * | 7/1980 | Sonetaka et al. .............. 502/66 |
| 4,295,892 | A |   | 10/1981 | Matsuhisa et al. ........... 501/120 |
| 4,448,833 | A | * | 5/1984 | Yamaguchi et al. ......... 428/116 |
| RE31,719 | E | * | 10/1984 | Sonetaka et al. .............. 502/63 |
| 4,659,585 | A | * | 4/1987 | Elias et al. ...................... 427/5 |
| 4,761,332 | A | * | 8/1988 | Elias et al. ................... 428/325 |
| 4,769,356 | A | * | 9/1988 | Takeuchi et al. ............. 502/242 |
| 4,857,499 | A | * | 8/1989 | Ito et al. ...................... 502/326 |
| 4,871,693 | A | * | 10/1989 | Inoue et al. .................... 501/9 |
| 5,039,647 | A | * | 8/1991 | Ihara et al. .................. 502/251 |
| 5,618,762 | A | * | 4/1997 | Shirakawa et al. ............. 501/1 |

(Continued)

FOREIGN PATENT DOCUMENTS

EP   0 393 565   10/1990

(Continued)

*Primary Examiner*—Cam N. Nguyen
(74) *Attorney, Agent, or Firm*—Burr & Brown

(57) ABSTRACT

A catalyst body including a catalytic material containing an alkali metal and/or an alkaline earth metal, a carrier carrying the catalytic material, and a method of manufacturing the catalyst body are provided. The carrier has a cordierite binder phase and aggregate phases dispersed in the cordierite binder phase.

12 Claims, 10 Drawing Sheets
(4 of 10 Drawing Sheet(s) Filed in Color)

10 μm

U.S. PATENT DOCUMENTS 5,721,037 A * 2/1998 Kumazawa et al. ......... 428/116
2003/0148063 A1 8/2003 Morimoto et al. ........... 428/116

FOREIGN PATENT DOCUMENTS

| EP | 1 153 649 | 11/2001 |
| JP | 2-83254 | 3/1990 |
| JP | 2001-232195 | 8/2001 |
| JP | 2002-59009 | 2/2002 |
| WO | WO 00/30995 | 6/2000 |
| WO | WO02/007043 | 12/2002 |

* cited by examiner

10μm

SCANNING DIRECTION OF
CONCENTRATION DISTRIBUTION

SCANNING DIRECTION OF
CONCENTRATION DISTRIBUTION

SCANNING DIRECTION OF
CONCENTRATION DISTRIBUTION

FIG.8(a) CONCENTRATION DISTRIBUTION OF POTASSIUM

FIG.8(b) CONCENTRATION DISTRIBUTION OF MAGNESIUM

FIG.8(c) CONCENTRATION DISTRIBUTION OF SILICON

FIG.8(d) CONCENTRATION DISTRIBUTION OF ALUMINUM

FIG.8(e) CONCENTRATION DISTRIBUTION OF BACKSCATTERD ELECTRONS

SCANNING DIRECTION OF
CONCENTRATION DISTRIBUTION

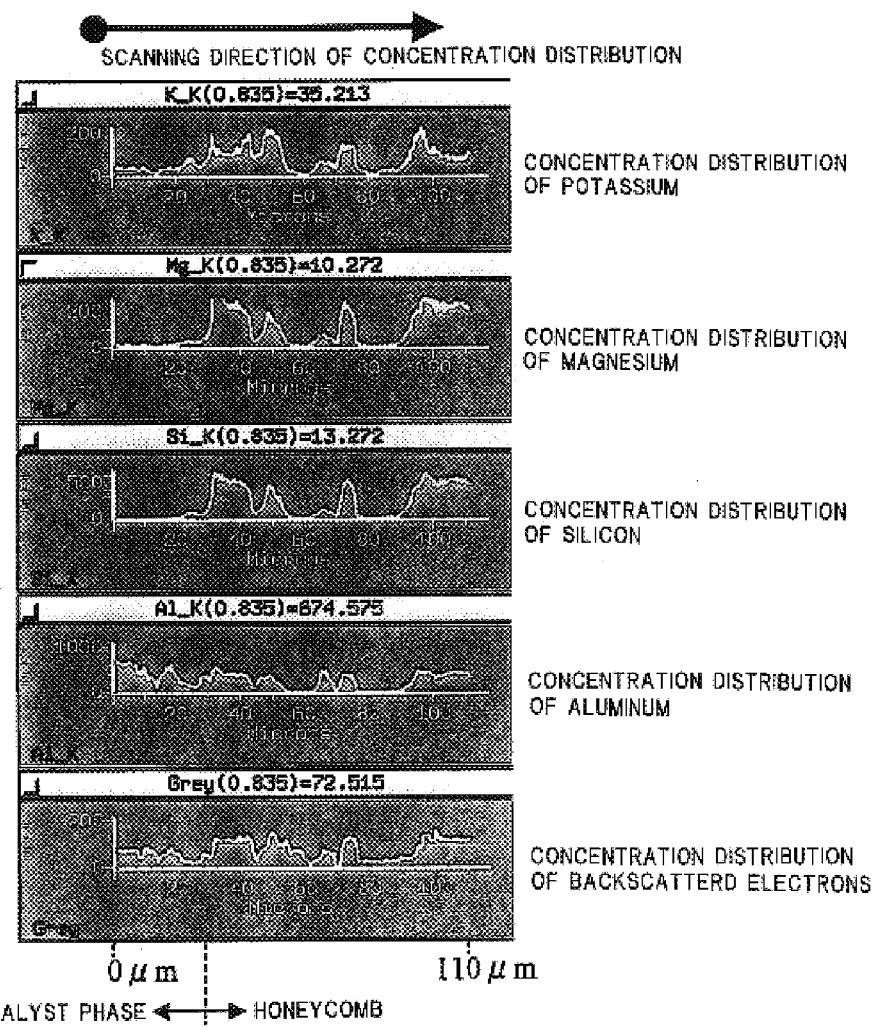

CATALYST ELEMENT AND MANUFACTURING METHOD THEREOF

TECHNICAL FIELD

The present invention relates to a catalyst body used suitably for purification of nitrogen oxides and the like and relates to a method for manufacturing the same. More particularly, the present invention relates to a catalyst body containing an alkali metal and/or an alkaline earth metal having high corrosion resistance to an alkali metal and/or an alkaline earth metal as well as hindering degradation of catalyst performance, and relates to a method for manufacturing the same.

BACKGROUND ART

In recent years, regulation for exhaust gas has become stricter and lean burn engines, direct injection engines, and the like have become widespread. In this situation, a nitrogen oxides (hereinafter referred to as $NO_x$) occlusion catalyst which can effectively purify $NO_x$ in exhaust gas in a lean atmosphere has been put into practical use. As $NO_x$ occlusion components used for the $NO_x$ occlusion catalyst, alkali metals such as K, Na, Li, and Cs, alkaline earth metals such as Ba and Ca, rare earth metals such as La and Y, and the like are known. In particular, Ba has been widely used from the beginning of practical use of the $NO_x$ occlusion catalyst. The addition of K excelling in the $NO_x$ occlusion capability in a high temperature range has been tried in recent investigations.

Such a $NO_x$ occlusion catalyst is usually formed from a catalytic material containing a $NO_x$ occlusion component such as an alkali metal and/or an alkaline earth metal (hereinafter referred to as "type of alkali metal") loaded on a carrier of an oxide-type ceramic material such as cordierite or a metallic material such as an Fe—Cr—Al alloy.

However, these carriers tend to become degraded by being corroded with a type of alkali metal, particularly with Li, Na, K, Ca, or the like, which is activated by high temperature exhaust gas. If degradation proceeds, a honeycomb carrier may crack. In addition, the catalyst performance decreases over time due to reaction of the carrier material with a type of alkali metal.

In J-P-A-2-83254 is disclosed a honeycomb structure having high thermal shock resistance. The honeycomb structure is obtained by forming a honeycomb formed body from a sheet formed body prepared from a raw material containing mullite and at least cordierite added thereto, then firing the honeycomb formed body at a temperature of melting cordierite to bond mullite via molten cordierite.

The invention disclosed in this patent application, however, does not aim to use it as a carrier but aims to provide a honeycomb structure having high porosity and thermal shock resistance that can be molded at a low temperature inexpensively. Therefore, problems of the honeycomb structure carrying a type of alkali metal catalyst are not disclosed.

SUMMARY OF THE INVENTION

The present invention is for providing a catalyst body in which the reaction of a type of alkali metal with a catalyst carrier is hindered to suppress degradation of the carrier and deterioration in catalyst performance, and providing a method for manufacturing the same.

As a result of extensive studies for the above issues, the inventors of the present invention have found that when only cordierite is used as a carrier, a type of alkali metal is dissolved in cordierite to form a solid solution, as a result the catalyst performance deteriorates as well as a crack tends to be caused in the carrier by expansion due to increase of lattice constant. The inventors have further found that by using cordierite as a binder phase and dispersing ceramic aggregate phases in cordierite, dissolution of a type of alkali metal into cordierite to form a solid solution can be hindered. These findings have led to the completion of the present invention.

That is, in a first aspect of the present invention, there is provided a catalyst body comprising: a catalytic material containing an alkali metal and/or an alkaline earth metal; and a carrier carrying the catalytic material, wherein the carrier comprises a cordierite binder phase and aggregate phases dispersed in the cordierite binder phase.

In the first aspect of the present invention, a ratio of the aggregate phases to a total of the aggregate phases and the cordierite binder phase is preferably 30 to 90 vol %. In addition, the aggregate phases preferably comprise aggregate dispersion phases having a distance between one aggregate dispersion phase and another aggregate dispersion phase nearest to the one aggregate dispersion phase being 10 μm or less. A median dispersion diameter of the aggregate phases is preferably 50 μm or less. The aggregate phases preferably contain coarse dispersion phases with a dispersion diameter of 5 μm or more and fine dispersion phases with a dispersion diameter of less than 5 μm, a ratio of the fine dispersion phases to a total of the fine dispersion phases and the cordierite binder phase being preferably 20 to 70 vol %. A ratio of the fine dispersion phases to a total of the fine dispersion phases and the coarse dispersion phases is preferably 10 vol % or more. The carrier is preferably formed from a carrier raw material comprising an aggregate raw material forming the aggregate phases and a binder raw material forming the cordierite binder phase, the aggregate raw material being preferably in a form of particles containing coarse particles with a particle diameter of 5 μm or more and fine particles with a particle diameter of less than 5 μm, a ratio of the fine particles to a total of the fine particles and the binder raw material being preferably 20 to 70 vol %. A ratio of the fine particles to a total of the fine particles and the coarse particles is preferably 10 vol % or more. The aggregate phases preferably comprise one or more kinds selected from the group consisting of mullite, silicon carbide, alumina, zirconia, titania, titanium phosphate and aluminum titanate. The carrier preferably has a honeycomb structure with a number of through-holes surrounded by partition walls. Moreover, the carrier preferably comprises a wall-shaped thin plate, the median dispersion diameter of the aggregate phases being preferably ⅕ or less of the thickness of the thin plate. The catalytic material preferably comprises one or more noble metals selected from the group consisting of Pt, Pd, and Rh.

In a second aspect of the present invention, there is provided a method for manufacturing a catalyst body comprising a catalytic material containing an alkali metal and/or an alkaline earth metal, and a carrier carrying the catalytic material, the method comprising steps of: (I) forming a formed body from a carrier raw material containing an aggregate raw material for forming aggregate phases and a binder raw material for forming a cordierite binder phase; (II) firing the formed body to form a carrier containing the cordierite binder phase and the aggregate phases dispersed in the cordierite binder phase; and (III) loading a catalytic material containing an alkali metal and/or an alkaline earth metal on the carrier.

In the second aspect of the present invention, a median particle diameter of the aggregate raw material is preferably 1 to 50 μm. The aggregate raw material preferably contains coarse particles with a particle diameter of 5 μm or more and fine particles with a particle diameter of less than 5 μm, a ratio of the fine particles to a total of the fine particles and the binder raw material being preferably 20 to 70 vol % A ratio of the fine particles to a total of the fine particles and the coarse particles is preferably 10 vol % or more. A ratio of the aggregate raw material in the carrier raw material to a total of the aggregate raw material and the binder raw material is preferably 30 to 90 vol %. The aggregate raw material is preferably one or more kinds selected from the group consisting of mullite, silicon carbide, alumina, zirconia, titania, titanium phosphate and aluminum titanate. The step (I) is preferably forming a formed body by extrusion.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIGS. 10(a) to 10(e) are photographs showing the concentration distribution of each element on the a-a line of FIG. 9, wherein FIGS. 10(a), 10(b), 10(c), 10(d), and 10(e) respectively show the concentration distributions of potassium, magnesium, silicon, aluminum, and backscattered electrons.

DETAILED DESCRIPTION OF THE INVENTION

The catalyst body containing an alkali metal and/or an alkaline earth metal and the method for manufacturing the catalyst body of the present invention will be described below in detail for specific embodiments. However, the present invention is not restricted to the following embodiment.

Figure 1:
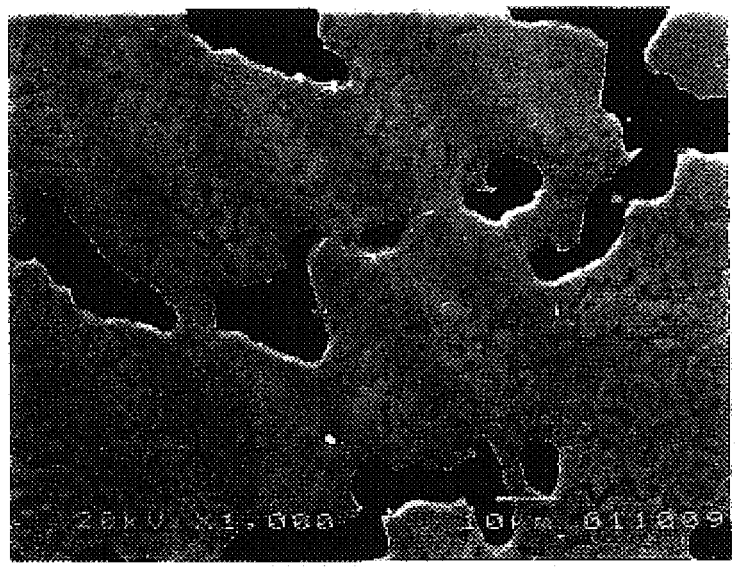
FIG. 1 is an electron micrograph (a backscattered electron image) of a section of the carrier of the present invention showing a dispersion pattern of the components in the carrier.
Figure 2:
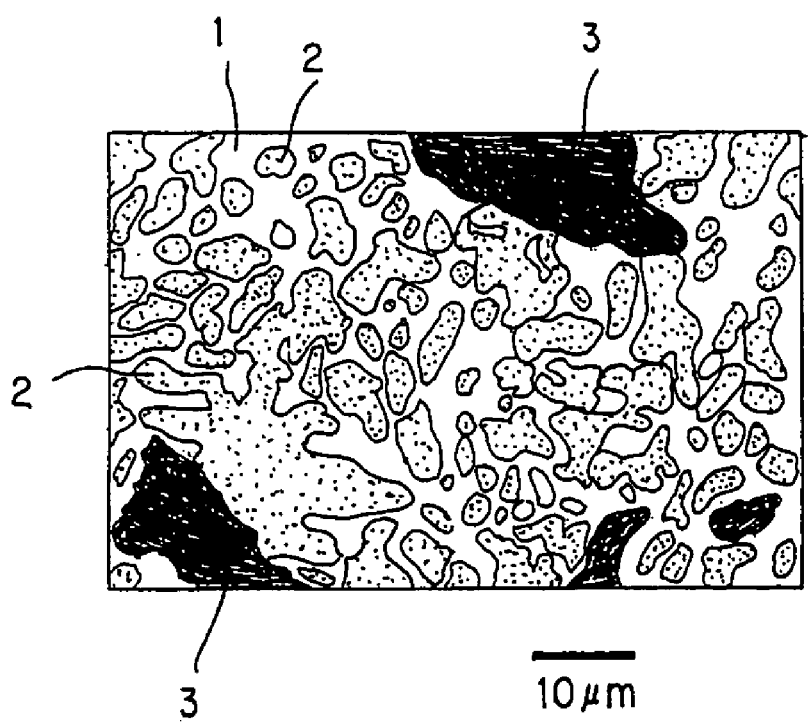
FIG. 2 is a schematically enlarged view of the upper left part of the electron micrograph (backscattered electron image) of FIG. 1.

A photograph of a cross-section of one embodiment of the carrier according to the present invention (a backscattered electron image) taken by a scanning electron microscope (SEM) is shown in FIG. 1, and a part of the photograph is schematically shown in FIG. 2. In one important feature of the catalyst body of the present invention, the carrier carrying a catalytic material containing an alkali metal and/or an alkaline earth metal comprises a cordierite binder phase 1 and aggregate phases 2 dispersed in the cordierite binder phase 1 as shown in FIG. 2. This carrier constitution makes the catalyst body low in degradation of the carrier and deterioration in catalyst performance. In the embodiment shown in FIG. 2, the symbol 3 indicates pores.

Such an effect is considered to be achieved by that the aggregate phases are dispersed in the cordierite binder phase to hinder diffusion of a type of alkali metal into cordierite, furthermore, to inhibit expansion of cracks even if cracks are caused. When a type of alkali metal, particularly potassium, is dissolved in the cordierite to form a solid solution, a stress is generated by increase in the lattice constant of the solid solution phase. This stress is one of the causes for cracks. However, when the aggregate phases are present, the length of the cordierite phase linearly extending in any directions is reduced to disperse the stress produced by increase in the lattice constant, whereby the stress is reduced.

There are no limitations as to the ratio of the aggregate phases to the cordierite binder phase in the present invention. From the above-mentioned viewpoint, if the ratio of the aggregate phases is too small, it will become difficult to achieve the effect of the present invention. If the ratio is too large, the amount of the binder material is too small, resulting in an inadequate binder force. The ratio of the aggregate phases to the total of the aggregate phases and the cordierite binder phase is preferably 30 to 90 vol %. Although the effect of durability improvement can be achieved to a certain extent with an amount of the aggregate phases in the range of 30% to less than 50% by volume, an amount of 50% by volume or more is more preferable in view of the strength retention rate. If the amount of the aggregate phases is in the range of more than 85 vol % to 90 vol %, the bonding force tends to be insufficient in case the dispersion diameter of the aggregate phases is small, that is, the surface area is large. Therefore, the amount of 85 vol % or less is more preferable. The amount of the aggregate phases in the range of 60 to 85 vol % is most preferable, because there is almost no decrease in the strength after a durability test.

To decrease the stress by reducing the length of the linearly extending cordierite binder phase, it is preferable that many aggregate phases be dispersed in the cordierite binder phase and the distance between the dispersed aggregate phases be small. Accordingly, it is preferable that the distance between one aggregate phase (aggregate dispersion phase) dispersed in the cordierite binder phase and another aggregate dispersion phase nearest to the one aggregate dispersion phase be 10 µm or less. And the aggregate phases preferably consist only of aggregate dispersion phases satisfying this requirement. Here, "the distance between one aggregate dispersion phase and another aggregate dispersion phase (distance between the phases)" indicates the shortest distance between the periphery of one aggregate dispersion phase and the periphery of another aggregate dispersion phase, and "another aggregate dispersion phase nearest to the one aggregate dispersion phase" indicates an aggregate dispersion phase of which the distance from the one aggregate dispersion phase is shortest.

Too large a median dispersion diameter of the aggregate phases also makes it difficult to reduce the stress and increases the risk of crack occurrence at the interface of the aggregate phases and the binder phase. On the other hand, if the median dispersion diameter is too small, the surface area of the aggregate phases becomes so large that it is necessary to increase the amount of the cordierite binder phase to achieve a sufficient bonding force. Therefore, the median dispersion diameter of the aggregate phases is preferably 1 to 50 µm, more preferably 1 to 35 µm. If the maximum dispersion diameter of the aggregate phases is too large, cracks are easily caused at the interface of that area. The maximum dispersion diameter is preferably 100 µm or less, more preferably 70 µm or less. The minimum dispersion diameter of the aggregate phases is preferably 0.5 µm or more. If the dispersion diameter is too small, it is difficult to achieve the effect of the aggregate, and firing shrinkage increases. The dispersion diameter in the present invention refers to the diameter of each aggregate dispersion phase dispersed in the binder phase, whereas the median dispersion diameter refers to the median diameter (median value) of the dispersion diameter distribution.

The aggregate phases preferably include coarse dispersion phases with a dispersion diameter of 5 µm or more and fine dispersion phases with a dispersion diameter of less than 5 µm. The ratio of the fine dispersion phases to the total of the fine dispersion phases and the cordierite binder phase is preferably 20 to 70 vol %, and more preferably 30 to 70 vol %. If the ratio is too small, it is difficult to reduce the length of the linearly extending cordierite binder phase; if too large, the ratio of the cordierite binder phase to the surface area of the aggregate phases unduly decreases, whereby a sufficient bonding effect may not be achieved.

To have the ratio (vol %) of the fine dispersion phase to the total of the fine dispersion phases and the cordierite binder phase in a specific range, it is preferable to use a material of particles containing coarse particles with a particle diameter of 5 µm or more and fine particles with a particle diameter of less than 5 µm as the aggregate raw material for forming the aggregate, and to form the carrier from a carrier raw material containing the material and a binder raw material to form the cordierite binder phase, so that the ratio of the fine particles to the total of the fine particles and the binder raw material may be 20 to 70 vol %. In general, in the formation of a carrier, cordierite and the like which are binder raw material melt to bind aggregate components which do not melt, whereby, a carrier is formed. Therefore, by forming a carrier from the carrier raw material mentioned above, the aggregate component can form the aggregate phases retaining the original particle diameter, enabling the ratio of the fine dispersion phases in a desired range.

If the ratio (vol %) of the fine dispersion phases to the total of the fine dispersion phases and the coarse dispersion phases is too small, the length of the linearly extending cordierite binder phase cannot be sufficiently reduced. The ratio is preferably 10% or more, more preferably 20% or more.

To have the ratio (vol %) of the fine dispersion phases to the total of the fine dispersion phases and the coarse dispersion phases in a specific range, it is also preferable to use a material of particles containing coarse particles with a particle diameter of 5 µm or more and fine particles with a particle diameter of less than 5 µm as the aggregate raw material for forming the aggregate, and to form the carrier from a carrier raw material containing the material and a binder raw material to form the cordierite binder phase, so that the ratio (vol %) of the fine particles to the total of the fine particles and the coarse particles may be 10% or more, preferably 20% or more.

The aggregate phases are preferably formed from one or more types of ceramics except for cordierite, preferably the ceramics having high corrosion resistance to a type of alkali metal. A large difference in the coefficient of thermal expansion between the aggregate and cordierite may cause cracks in the interface of the aggregate phases and the cordierite binder phase, as well as may unduly increase the coefficient of thermal expansion as a whole. A preferable coefficient of thermal expansion of the aggregate phases is $0.5 \times 10^{-6}$ to $10 \times 10^{-6}/°$ C. As a preferable specific example of the aggregate phase, an aggregate phase formed from one or more kinds selected from the group consisting of mullite, silicon carbide, alumina, zirconia, titania, titanium phosphate, and aluminum titanate can be given. Mullite and silicon carbide are particularly preferable.

There are no specific limitations to the form of the carrier used for the catalyst body of the present invention. The above-described effect of hindering degradation can be obtained by using any carrier forms such as a monolith honeycomb, pellet, bead, ring, foam, and the like. Among them, a carrier in the form of honeycomb (honeycomb carrier) composed of a number of through-holes (cells) divided by partition walls brings about the largest effect.

When the carrier has a wall-shaped thin plate, a preferable range of the median dispersion diameter of the aggregate phases also depends on the wall thickness, particularly on the partition wall thickness when the carrier is a honeycomb structure. Too large a median dispersion diameter of the aggregate phases relative to the thickness of the wall is undesirable due to difficulty in obtaining a sufficient bonding effect of the aggregate phases by the binder phase. An additional drawback of an excessively large median dispersion diameter is that in, for example, extrusion, blocking of the die may easily occur. Therefore, the median dispersion diameter of the aggregate phases is preferably ⅕ or less, more preferably 1/10 or less, of the wall thickness. The maximum dispersion diameter of the aggregate phases also depends on the wall thickness, particularly on the partition wall thickness when the carrier is a honeycomb structure, and is preferably ½ or less, more preferably ⅓ or less, and most preferably ⅕ or less, of the wall thickness.

The through-hole (cell) of the honeycomb carrier may have any form such as a circle or polygon, or may have a corrugated structure. A through-hole with a circular or a polyangular (quadrangular or higher polyangular) cross-section may hinder a large amount of catalyst loading at the corners and make the thickness of the catalyst layer uniform. A hexagonal cell is suitable from the viewpoint of the cell density, ratio of open frontal area, and polyangular balance. The contour of the honeycomb carrier can be formed into a desired form conforming to the inner shape of an exhaust gas system in which the honeycomb carrier is installed. A honeycomb carrier obtained by bonding a plurality of segments into one piece and a honeycomb carrier having a slit are also preferable. The thermal stress can be dispersed to hinder cracks due to the thermal stress by bonding a plurality of segments into one piece, or by forming a slit in the honeycomb carrier.

There are no specific limitations as to a cell density of the honeycomb carrier. The cell density is preferably in the range of 6 to 1,500 cells/square inch (0.9 to 233 cells/cm$^2$) for the catalyst carrier. The thickness of partition walls is preferably in the range of 20 to 2,000 µm. When the carrier has a thin wall with a thickness of 20 to 200 µm, an alkali metal and/or an alkaline earth metal can easily diffuse to the center of the wall in the thickness direction. In such a case, a need of the present invention increases, as well as the effect of hindering degradation of the catalyst increases.

Although not necessarily essential, the carrier preferably has pores in the present invention. Since an alkali metal and/or an alkaline earth metal can easily diffuse in the carrier through the pores, particularly in the carrier having a high porosity of 10% or more, and preferably 20% or more, a need of the present invention increases, as well as the effect of hindering degradation of the catalyst increases.

Although there are no specific limitations as to the alkali metal and/or alkaline earth metal contained in the catalytic material of the present invention, Li, Na, K, Cs, and the like can be given as the alkali metal, and Ca, Ba, Sr, and the like can be given as the alkaline earth metal. The effect of the present invention is most remarkable when an alkali metal having high reactivity with cordierite, such as K, is used.

It is preferable that the catalytic material contain a noble metal such as Pt, Pd, and Rh as a catalyst component, in addition to the alkali metal and/or alkaline earth metal. These noble metals can make reaction of NO in exhaust gas with $O_2$ to form $NO_2$ before the alkali metal and/or alkaline earth metal occlude NOx. The noble metals can also make reaction of NOx with inflammable components in the exhaust gas to form innoxious compounds, when the occluded NOx is released. As another constituent of the catalytic material, a heat resistant inorganic oxide with a large specific surface area such as alumina is preferable to load the alkali metal and/or alkaline earth metal and the noble metal in a highly dispersed state.

The catalyst body of the present invention may be used together with other exhaust gas purification materials such as a NOx occlusion catalyst comprising another component, another type of catalyst represented by a three way catalyst, a co-catalyst represented by an oxide of Ce and/or Zr, an HC adsorbent, and the like which can be applied to a exhaust gas purification system. In such an instance, it is possible to mix these exhaust gas purification materials with the catalytic material in the catalyst body of the present invention. A more preferable manner of use is to load these exhaust gas purification materials and the catalytic material in layers to achieve higher corrosion resistance. It is also possible to appropriately combine these exhaust gas purification agents, prepared as separate bodies, with the catalyst body of the present invention in the exhaust gas purification system.

A specific embodiment of the method of the present invention for preparing a catalyst body comprising a catalytic material containing an alkali metal and/or an alkaline earth metal loaded on a carrier will now be described.

In the second aspect of the present invention, (I) a carrier raw material containing an aggregate raw material for forming aggregate phases and a binder raw material for forming a cordierite binder phase is formed into a formed body (hereinafter referred to as "forming step").

The binder raw material for forming the cordierite binder phase refers to cordierite itself or a raw material converted into cordierite by firing. The examples of the material converted into cordierite by firing include a mixture selected among talc, kaolin, calcinated kaolin, alumina, aluminum hydroxide, and silica mixed at a predetermined ratio such that a chemical composition in the mixture is in a range of 42 to 56 mass % of $SiO_2$, 30 to 45 mass % of $Al_2O_3$, and 12 to 16 mass % of MgO.

The aggregate raw material for forming the aggregate phases refers to a raw material for the aggregate phase that can be dispersed into the cordierite binder phase by firing. Ceramics other than cordierite, for example, are preferable. The aggregate raw material preferably has high corrosion resistance to a type of alkali metal and a low coefficient of thermal expansion. As preferable examples of the aggregate raw material, one or more kinds selected from the group consisting of mullite, silicon carbide, alumina, zirconia, titania, titanium phosphate, and aluminum titanate can be given.

There are no specific limitations as to the median particle diameter of the aggregate raw material. Too small a median particle diameter is undesirable, because the surface area of the aggregate phases becomes so large that it is necessary to increase the amount of the cordierite binder phase to obtain a sufficient bonding force. On the other hand, too large a median particle diameter is undesirable, because such a large median particle diameter results in too large a median dispersion diameter of the aggregate phases, which makes it difficult to reduce the stress and increases the risk of crack occurrence at the interface of the aggregate phases and the binder phase. A preferable range for the median particle diameter of the aggregate raw material is 1 to 50 µm, with a more preferable range being 1 to 35 µm, and the most preferable range being 2 to 25 µm. In the present invention, the median particle diameter refers to a median value of the particle diameters measured by the laser diffraction-scattering method.

The aggregate raw material preferably includes coarse particles with a particle diameter of 5 µm or more and fine particles with a particle diameter of less than 5 µm. The ratio of the fine particles to the total of the fine particles and the binder raw material is preferably 20 to 70% by volume. If this ratio is too small, it is difficult to reduce the length of the linearly extending cordierite binder phase; if too large, it is difficult to obtain a sufficient bonding effect of the aggregate phases.

If the ratio (vol %) of the fine particles to the total of the fine particles and the coarse particles is too small, the length of the linearly extending cordierite binder phase cannot be sufficiently reduced. The ratio is preferably 10% or more, more preferably 20% or more.

If the amount of the aggregate raw material is too small, it is difficult to obtain the effect of the present invention; if the amount is too large, the amount of the binder raw material is insufficient, resulting in an inadequate binder force. The amount of the aggregate raw material in the raw material mixture is preferably 30 to 90 vol %, more preferably 50 to 85 vol %, and most preferably 60 to 85 vol %, to the total of the binder raw material and the aggregate raw material.

In the forming step (I), the above binder raw material and aggregate raw material are blended in a predetermined ratio. Thereto, given amounts of a synthetic resin such as PET, PMMA, crosslinked polystyrene, and phenol resin; a type of methyl cellulose; a surfactant; a pore forming agent; and the like are added. Then an appropriate amount of water is added, followed by kneading the mixture to produce kneaded compound. After deaeration under vacuum, for example, the kneaded compound is formed into a formed body with a predetermined shape. Extrusion using an extruder is preferable from the viewpoint of mass-production and formability. Extrusion into a honeycomb structure is more preferable.

Next, the obtained formed body is fired in step (II), whereby a carrier comprising the cordierite binder phase and the aggregate phases dispersed in the cordierite binder phase is formed (hereinafter referred to as "firing step").

In the firing step (II), the carrier comprising the cordierite binder phase and the aggregate phases dispersed in the cordierite binder phase can be formed by drying the formed body obtained in the forming step (I) using dielectric drying, microwave drying, or hot air drying, then degreasing and firing the dried product, for example. If the highest temperature in the firing step is too high, too great an amount of the aggregate phases is melted, making it difficult to obtain aggregate phases dispersed with a specified particle diameter. If the fusing temperature is too low, cordierite will not be melted or it is difficult for the binder raw material to convert into cordierite. A preferable highest temperature for firing is a temperature at which the cordierite is melted and the particle diameter of the aggregate raw material is substantially the same as the dispersion diameter of the aggregate phases, and more preferably a temperature at which the cordierite does not become amorphous. Although the specific temperature differs according to the type of the ceramic aggregate, a range of 1,300 to 1,550° C. is preferable, with a more preferable range being 1,400 to 1,450° C.

Next, in step (III), the catalytic material containing an alkali metal and/or an alkaline earth metal is loaded on the resulting carrier (hereinafter referred to as "loading step").

In the loading step (III), the carrier obtained in the firing step (II) is wash-coated with a wash-coating slurry obtained from a mixture of $\gamma$-$Al_2O_3$ powder and a solution containing an alkali metal such as potassium and an optional noble metal such as platinum. Then, it is dried, and fired in an electric furnace to load the catalytic material containing an alkali metal and/or an alkaline earth metal on the carrier. The catalyst body comprising the catalytic material containing an alkali metal and/or an alkaline earth metal loaded on the carrier can be manufactured in this manner.

The present invention is described below in more detail by examples. However, the present invention is not limited to the following examples.

Preparation of Raw Material for Catalytic Material

Commercially available $\gamma$-$Al_2O_3$ powder (specific surface area: 200 m²/g) was dipped in a solution obtained by mixing an aqueous solution of $(NH_3)_2Pt(NO_2)_2$ and an aqueous solution of $KNO_3$. The mixture was stirred for two hours in a pot mill and water was evaporated to dryness. The dried product was dry-pulverized and fired in an electric furnace at 600° C. for three hours To the $\gamma$-$Al_2O_3$ powder containing potassium and platinum ((Pt+K)-predoped $\gamma$-$Al_2O_3$) obtained in this manner were added commercially available $Al_2O_3$ sol and water. The mixture was wet-pulverized in a pot mill again to obtain a wash-coating slurry. The relative amounts of $\gamma$-$Al_2O_3$, platinum, and potassium were adjusted in the blending/dipping stage so that the loading amount of Pt may be 30 g/cft (1.06 g/L) (weight of Pt element per honeycomb volume) and the loading amount of K may be 20 g/L (weight of K element per honeycomb volume) for the loading amount of 100 g/L (per honeycomb volume) of the potassium catalyst after firing the honeycomb carrier which had been wash-coated with the slurry. The $Al_2O_3$ sol was added to give a solid content as $Al_2O_3$ of 5 wt %. An appropriate amount of water was added to provide the slurry with a viscosity for easy wash-coating.

EXAMPLE 1

As a binder raw material, cordierite powder was prepared by mixing talc powder, kaolin powder, and aluminum hydroxide powder in a ratio to give a cordierite elementary ratio. As an aggregate raw material, mullite powder with a maximum particle diameter of 100 μm, a minimum particle diameter of 5 μm, and a median particle diameter of 22 μm was prepared. To 90 vol % of the cordierite powder was mixed 10 vol % of mullite powder. To 100 parts by weight of the mixture were added 8 parts by weight of hydroxypropyl methylcellulose, 0.5 part by weight of potassium laurate soap, 2 parts by weight of polyether, and 28 parts by weight of water, then they were kneaded. The kneaded material was formed by extrusion into a honeycomb formed body. After drying, the resulting formed body was degreased to remove the binder, followed by firing at 1,420° C. to obtain a honeycomb carrier with a partition wall thickness of 300 μm (12 mil). The ratio (vol %) of the fine particles (with a particle diameter of less than 5 μm) in the aggregate raw material used here to the total of the fine particles and the cordierite binder phase is shown in Table 1 as a fine particle ratio 2. The ratio (vol %) of the fine particles to the total of the fine particles and the coarse particles (with a particle diameter of 5 μm or more) is shown in Table 1 as a fine particle ratio 1. The particle diameter was measured using the Laser Diffraction Particle Size Analyzer, SALD-200A, manufactured by Shimadzu Corp. Since the aggregate is not melted under the above-mentioned conditions, the dispersion diameter of the aggregate dispersion phases is presumed to be the same as that of the particle diameter of the raw material.

The obtained carrier was dipped in the wash-coating slurry obtained in the preparation of the catalyst raw material and an excessive solution in the cells was blown off, following which the catalyst was dried. The amount of potassium loaded on the catalyst was adjusted to become 20 g/L (the mass of potassium per volume of the carrier) after firing. When the loading amount was insufficient upon one dip-drying operation, dipping and drying were repeated until a desired amount of potassium was loaded. The resulting honeycomb body was fired in an electric furnace at 600° C. for one hour to obtain a catalyst body.

EXAMPLES 2 TO 10 AND COMPARATIVE EXAMPLE 1

Catalyst bodies of Examples 2 to 10 were obtained in the same manner as in Example 1, except that the type, amount, and particle diameter distribution of the aggregate raw material were changed as shown in Table 1. A catalyst body of Comparative Example 1 was prepared in the same manner as in Example 1, except that the aggregate raw material was not used.

(Durability Test)

An accelerated durability test was carried out by allowing the catalyst bodies obtained in Examples 1 to 10 and Comparative Example 1 to stand in an electric furnace at 850° C. for 30 hours in the presence of 10% moisture.

(Potassium Distribution Measurement)

To investigate the migration degree of potassium into the carrier, the distribution of each element after the durability test of the catalyst bodies obtained in Example 3 and Comparative Example 1 was measured using an X-ray microanalyzer attached to a scanning electron microscope. The results are shown in FIGS. 3 to 10.

(Evaluation of Inhibiting Effect Against Degradation of Carrier)

Cracks was examined before and after the durability test by visual inspection (observation of macrocracks) and micro inspection using an electron microscope (observation of microcracks). The results are shown in Table 1.

The bending strength was measured before and after the durability test by a method based on JIS R1601. The ratio of the bending strength after the durability test to the bending strength before the durability test (100%) was determined as a strength retention rate. The results are shown in Table 1.

Figure 7:
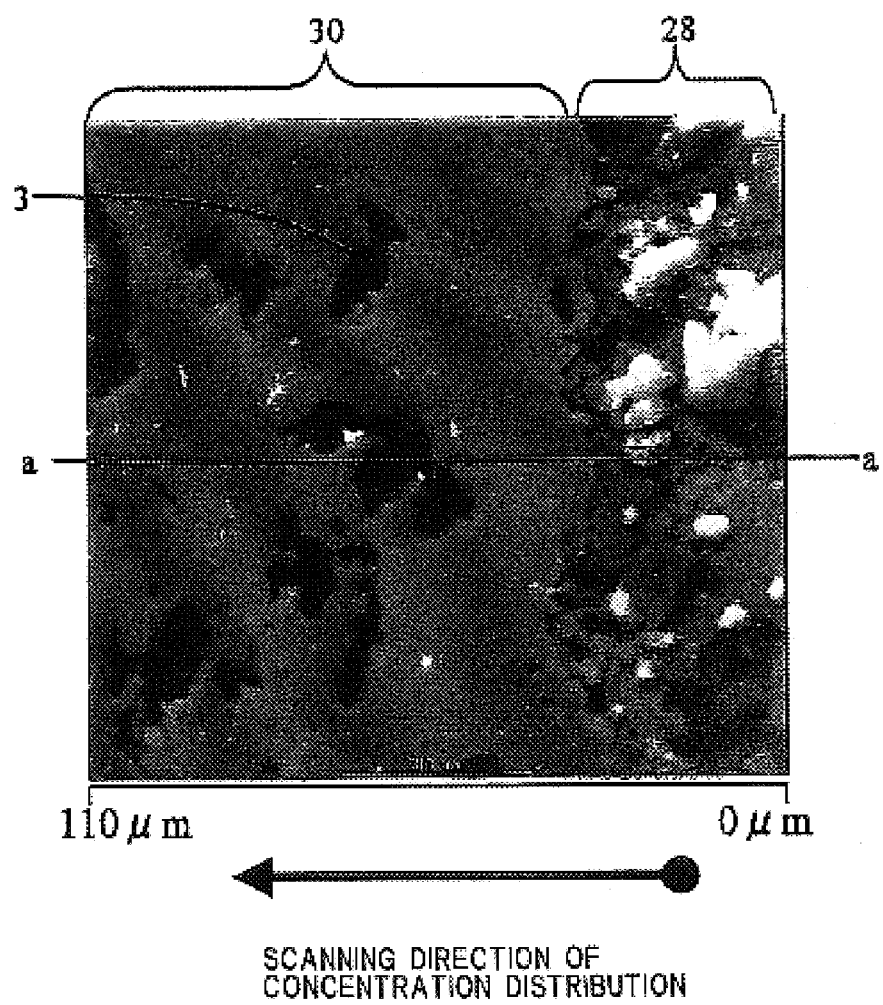
FIG. 7 is a scanning electron micrograph (a backscattered electron image) of a section of the catalyst obtained in Comparative Example 1 before a durability test.
Figure 8:
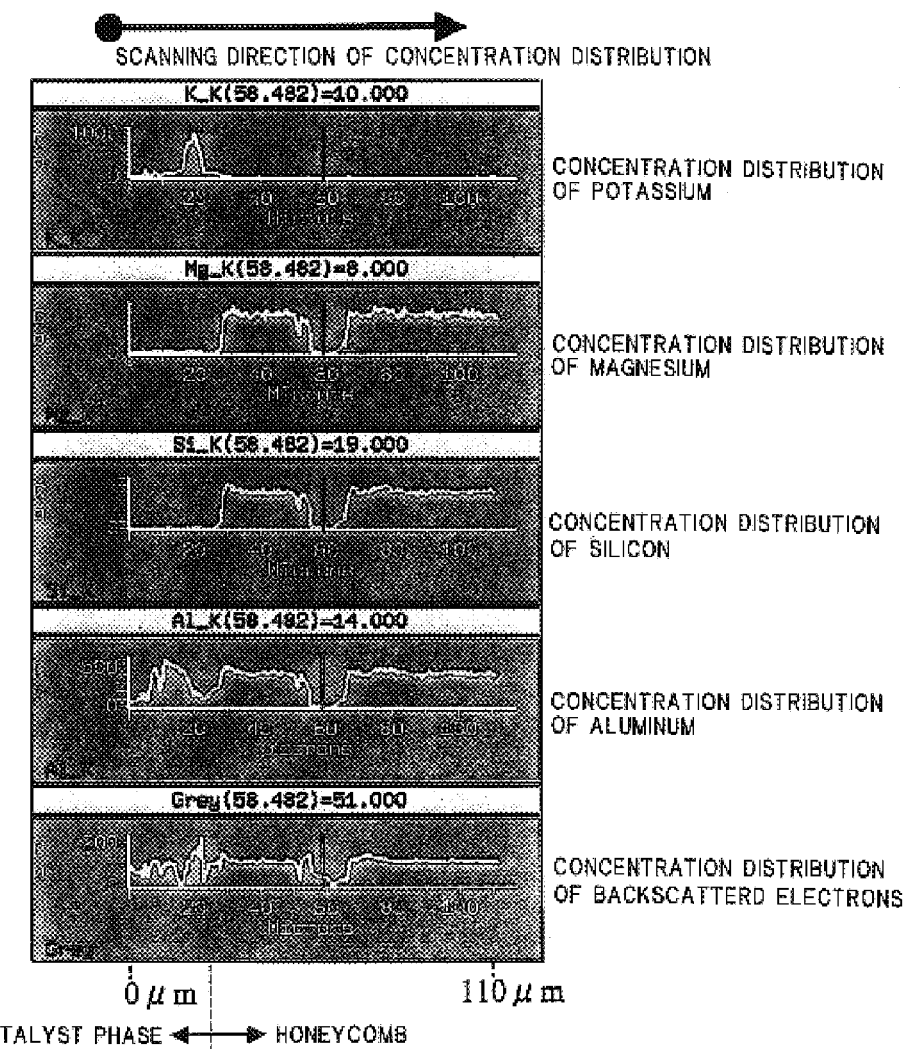
FIGS. 8(a) to 8(e) are photographs showing the concentration distribution of each element on the a-a line of FIG. 7, wherein FIGS. 8(a), 8(b), 8(c), 8(d), and 8(e) respectively show the concentration distributions of potassium, magnesium, silicon, aluminum, and backscattered electrons.
Figure 9:
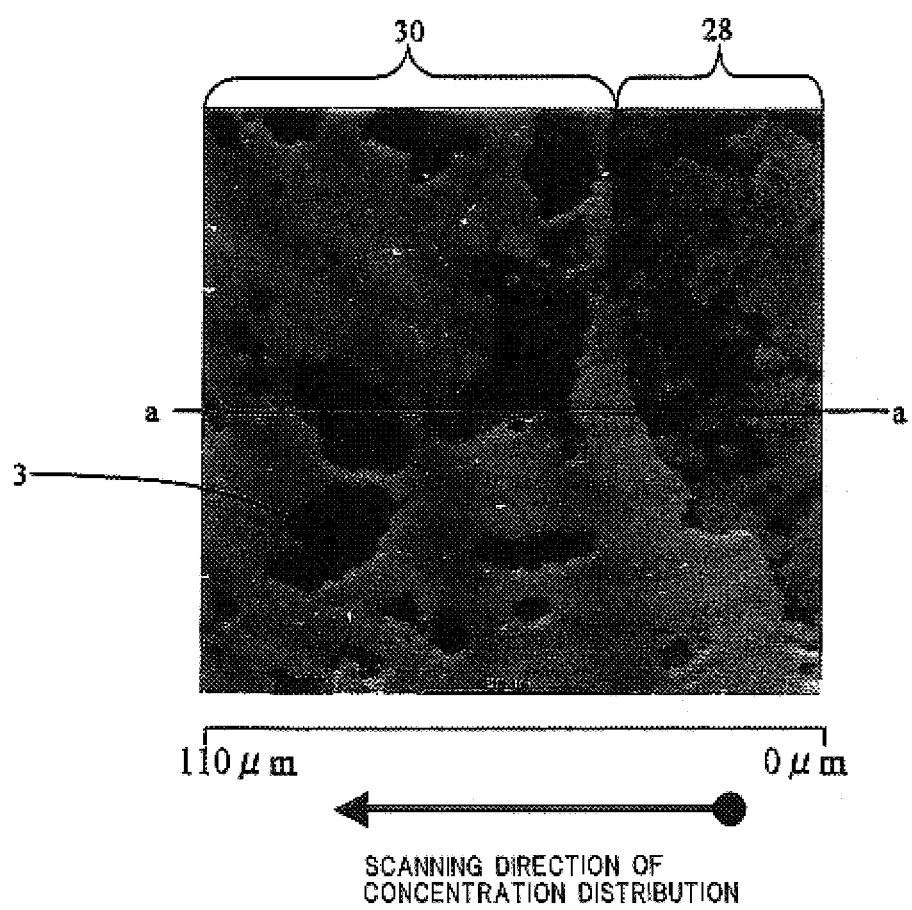
FIG. 9 is a scanning electron micrograph (a backscattered electron image) of a section of the catalyst obtained in Comparative Example 1 after the durability test.

FIG. 7 and FIG. 9 are scanning electron micrographs (backscattered electron images) of the section of the catalyst body obtained in Comparative Example 1, respectively before and after the durability test. FIGS. 8(a) to 8(e) and FIGS. 10(a) to 10(e) are charts showing the concentration distributions of K, Mg, Si, Al, and backscattered electrons along the a-a line, respectively in the photographs of FIG. 7 and FIG. 9. It can be seen from FIG. 7 and FIGS. 8(a) to 8(e) showing the state before the durability test that potassium (K)

is present only in the catalyst phase 28, but not in the carrier 30 of the catalyst body obtained in Comparative Example 1 before the durability test. Also it can be seen from FIG. 9 and FIGS. 10(a) to 10(e) showing the state after the durability test that the concentration distribution of K after the durability test is almost the same as the distribution of magnesium (Mg) used as an index for distribution of cordierite and that almost all potassium has disappeared from the catalyst phase 28 and has been distributed all over the carrier 30 consisting of cordierite except for the pores 3. This indicates that potassium is widely dissolved in the carrier material to form solid solution.

Figure 3:
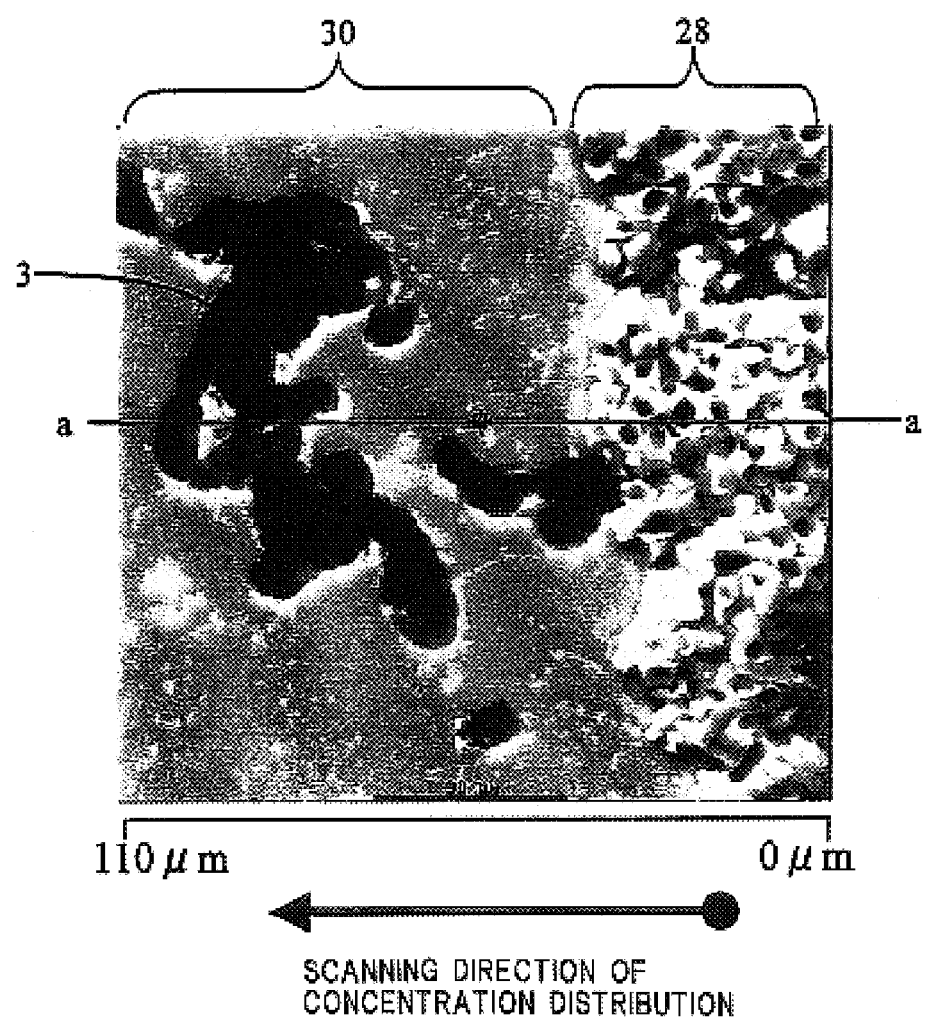
FIG. 3 is an electron micrograph (a backscattered electron image) of a section of the catalyst body obtained in Example 3 before a durability test.
Figure 4:
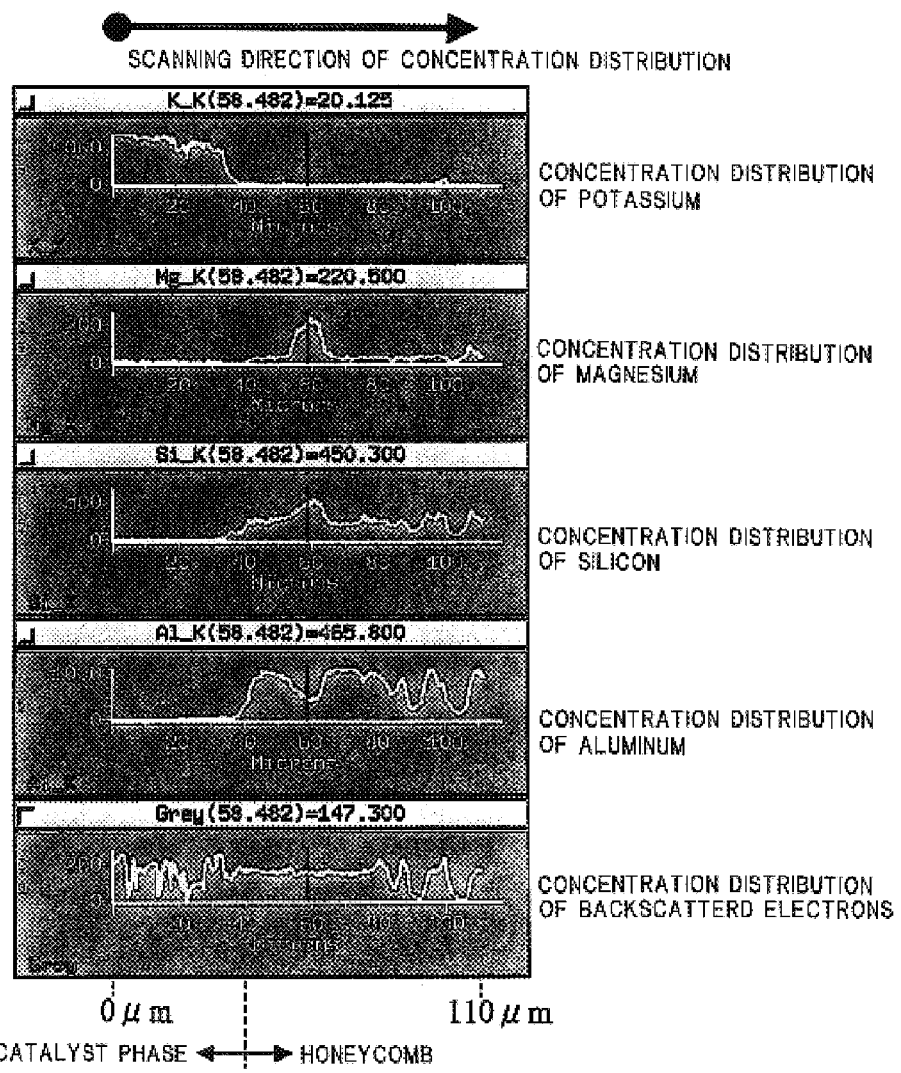
FIGS. 4(a) to 4(e) are photographs showing the concentration distribution of each element on the a-a line of FIG. 3, wherein FIGS. 4(a), 4(b), 4(c), 4(d), and 4(e) respectively show the concentration distributions of potassium, magnesium, silicon, aluminum, and backscattered electrons.
Figure 5:
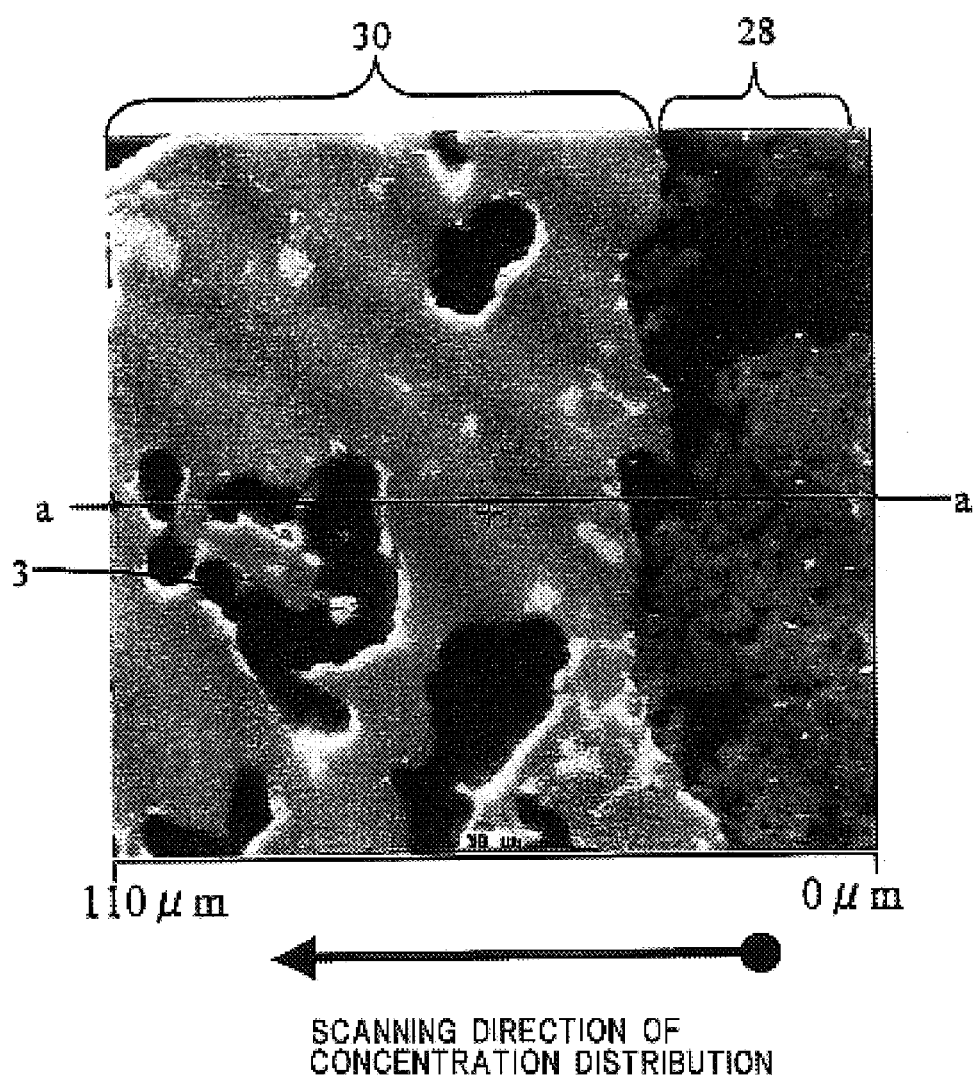
FIG. 5 is a scanning electron micrograph (a backscattered electron image) of a section of the catalyst body obtained in Example 3 after the durability test.
Figure 6:
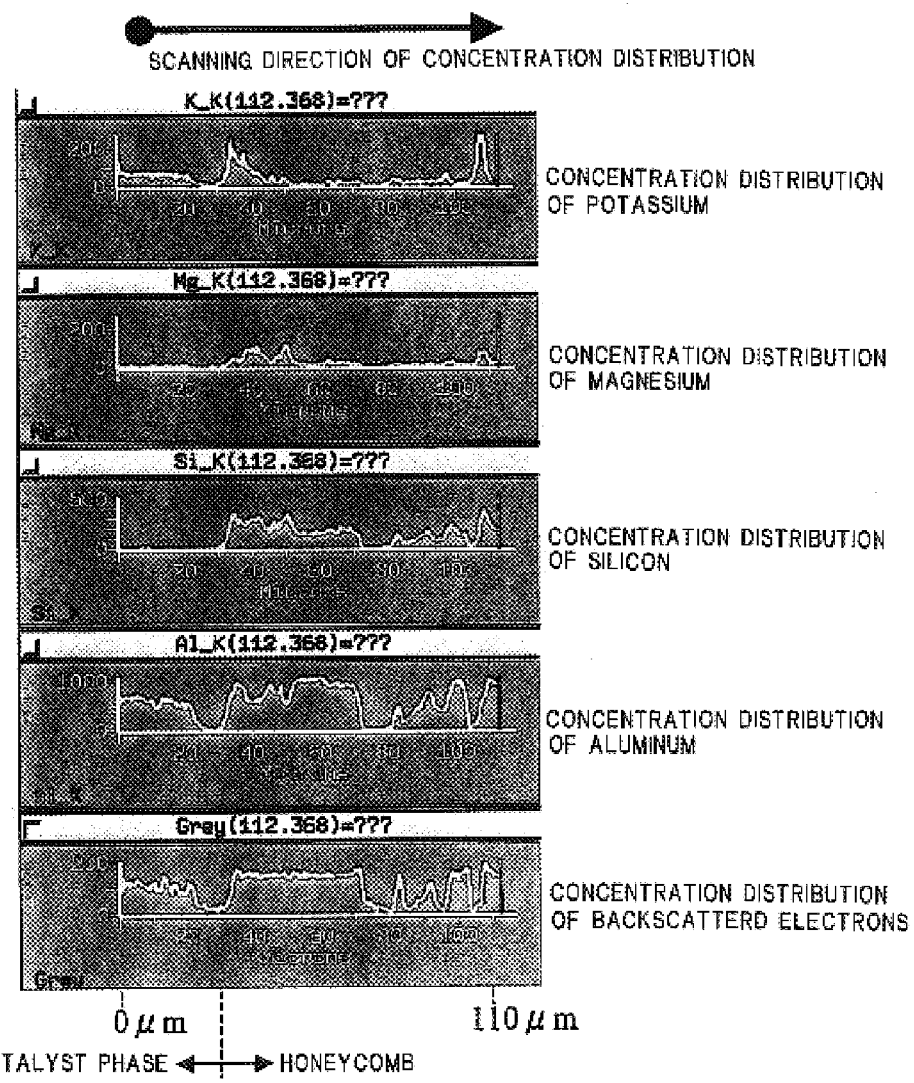
FIGS. 6(a) to 6(e) are photographs showing the concentration distribution of each element on the a-a line of FIG. 5, wherein FIGS. 6(a), 6(b), 6(c), 6(d), and 6(e) respectively show the concentration distributions of potassium, magnesium, silicon, aluminum, and backscattered electrons.

FIG. 3 and FIG. 5 are scanning electron micrographs (backscattered electron images) of the section of the catalyst body obtained in Example 3, respectively before and after the durability test. FIGS. 4(a) to 4(e) and FIGS. 6(a) to 6(e) are charts showing the concentration distributions of K, Mg, Si, Al, and backscattered electrons along the a-a line, respectively in the photographs of FIG. 3 and FIG. 5. It can be seen 10, and even after the durability test in the catalyst bodies obtained in Examples 1 to 4, 6, 7, and 10. The strength retention rate of the catalyst body obtained in Comparative Example 1 was about 35%, whereas all catalyst bodies obtained in Examples 1 to 10 exhibited a better strength retention rate.

In particular, the catalyst bodies obtained in Examples 1 to 4 and 10 exhibited a very good strength retention rate, because of the fact that their aggregate ratio, fine particle ratios 1 and 2, and particle diameter distribution of the aggregate raw material (specifically, the dispersion diameter distribution of the aggregate phases) are in a suitable range. The catalyst bodies obtained in Examples 8 and 9 showed some degree of improvement over the catalyst body of Comparative Example 1, the effect was small because in the catalyst body of Example 8, fine particle ratios and a particle diameter distribution of the aggregate raw material were outside the suitable ranges, and in the catalyst body of Example 9, fine particle ratios were outside the suitable ranges.

TABLE 1

| | Aggregate raw material | Amount (vol %) | | Particle diameter distribution of aggregate raw material | | | Strength retention rate (%) | Initial stage | After durability test | |
|---|---|---|---|---|---|---|---|---|---|---|
| | | (Aggregate: cordierite) | Fine particle ratio 1 | Fine particle ratio 2 | Median diameter (μm) | Minimum diameter (μm) | Maximum diameter (μm) | | Micro-cracks | Macro-cracks | Micro-cracks |
| Example 1 | Mullite | 90:10 | 20% | 64% | 22 | 0.5 | 100 | 74 | None | None | None |
| Example 2 | Mullite | 80:20 | 20% | 44% | 22 | 0.5 | 100 | 90 | None | None | None |
| Example 3 | Mullite | 70:30 | 20% | 32% | 22 | 0.5 | 100 | 85 | None | None | None |
| Example 4 | Mullite | 70:30 | 55% | 56% | 4 | 0.5 | 20 | 100 | None | None | None |
| Example 5 | Mullite | 50:50 | 20% | 16% | 22 | 0.5 | 100 | 61 | None | None | Present |
| Example 6 | Mullite | 50:50 | 55% | 35% | 4 | 0.5 | 20 | 85 | None | None | None |
| Example 7 | SiC | 70:30 | 11% | 20% | 32 | 0.5 | 100 | 98 | None | None | None |
| Example 8 | Mullite | 50:50 | 0% | 0% | 100 | 5 | 300 | 45 | Present | None | Present |
| Example 9 | Mullite | 20:80 | 20% | 5% | 22 | 0.5 | 100 | 40 | None | Present | Present |
| Example 10 | Mullite | 70:30 | 85% | 66% | 2 | 0.5 | 20 | 100 | None | None | None |
| Comparative Example 1 | None | — | — | — | — | — | — | 35 | Present | Present | Present | from FIG. 3 and FIGS. 4(a) to 4(e) showing the state before the durability test that potassium is present only in the catalyst phase 28 in the same manner as in the catalyst body of Comparative Example 1. However, it can be seen from FIG. 5 and FIGS. 6(a)-6(e) showing the state after the durability test that only a small amount of potassium has migrated into the carrier 30 of the catalyst body obtained in Example 3. FIG. 5 and FIGS. 6(a) to 6(e) further show that the distribution of K did not correspond to the distribution of Mg used as an index for distribution of cordierite as compared with the case in FIGS. 10(a) to 10(e). Therefore, it can be understood that the potassium distribution in the carrier material is small even after the durability test, showing that the reaction of potassium to form a solid solution in the carrier material is inhibited. In FIG. 5 and FIGS. 6(a) to 6(e), the mullite aggregate phase was shown to exist near the position of 50 to 70 μm where almost no Mg was detected and aluminum (Al) and silicon (Si) were detected. In the aggregate phase, no potassium was detected.

In addition, it can be seen from the results shown in Table 1 that in the catalyst body obtained in Comparative Example 1 microcracks that are presumed to have been produced by firing were observed at the initial stage (before the durability test) and macrocracks were observed after the durability test. On the other hand, no microcracks were observed at the initial stage in the catalyst bodies obtained in Examples 1 to 7, 9, and

INDUSTRIAL APPLICABILITY

As discussed above, in the catalyst body comprising a catalytic material containing an alkali metal loaded on a carrier of the present invention, the reaction of the type of alkali metal with the carrier is hindered because of the presence of a cordierite binder phase and aggregate phases dispersed in the cordierite binder phase in the carrier. The catalyst body exhibits an excellent strength retention rate and superior crack resistance and, therefore, can be expected to maintain excellent catalyst performance. The catalyst body can be used for various applications and is particularly useful as a catalyst body for purification of exhaust gas. The catalyst body can be suitably manufactured by the method of the present invention.

The invention claimed is:

1. A catalyst body comprising:
   a catalytic material containing at least one of an alkali metal and an alkaline earth metal; and
   a carrier carrying the catalytic material;
   wherein the carrier comprises a cordierite binder phase and aggregate phases dispersed in the cordierite binder phase.

2. The catalyst body according to claim 1, wherein a ratio of an amount of the aggregate phases to a total amount of the aggregate phases and the cordierite binder phase is 30 to 90 vol %.

3. The catalyst body according to claim 1, wherein the aggregate phases comprise aggregate dispersion phases, and wherein a distance between one aggregate dispersion phase and a nearest one of another aggregate dispersion phase is 10 µm or less.

4. The catalyst body according to claim 1, wherein a median dispersion diameter of the aggregate phases is 50 µm or less.

5. The catalyst body according to claim 1, wherein the aggregate phases contain coarse dispersion phases with a dispersion diameter of 5 µm or more and fine dispersion phases with a dispersion diameter of less than 5 µm, and wherein a ratio of an amount of the fine dispersion phases to a total amount of the fine dispersion phases and the cordierite binder phase is 20 to 70 vol %.

6. The catalyst body according to claim 5, wherein a ratio of an amount of the fine dispersion phases to a total amount of the fine dispersion phases and the coarse dispersion phases is 10 vol % or more.

7. The catalyst body according to claim 1, wherein the carrier is formed from a carrier raw material comprising:
   an aggregate raw material forming the aggregate phases; and
   a binder raw material forming the cordierite binder phase;
   wherein the aggregate raw material comprises particles containing coarse particles with a particle diameter of 5 µm or more and fine particles with a particle diameter of less than 5 µm; and
   wherein a ratio of an amount of the fine particles to a total amount of the fine particles and the binder raw material is 20 to 70 vol %.

8. The catalyst body according to claim 7, wherein a ratio of an amount of the fine particles to a total amount of the fine particles and the coarse particles is 10 vol % or more.

9. The catalyst body according to claim 1, wherein the aggregate phases comprise one or more members selected from the group consisting of mullite, silicon carbide, alumina, zirconia, titania, titanium phosphate and aluminum titanate.

10. The catalyst body according to claim 1, wherein the carrier has a honeycomb structure with a number of through-holes surrounded by partition walls.

11. The catalyst body according to claim 1, wherein the carrier comprises a wall-shaped thin plate, and wherein a median dispersion diameter of the aggregate phases is ⅕ or less with respect to the thickness of the thin plate.

12. The catalyst body according to claim 1, wherein the catalytic material comprises one or more noble metals selected from the group consisting of Pt, Pd, and Rh.

* * * * *